(12) United States Patent
Arimitsu et al.

(10) Patent No.: US 8,805,022 B2
(45) Date of Patent: Aug. 12, 2014

(54) VELOCITY DETECTION APPARATUS HAVING TWO DETECTORS

(75) Inventors: Yasumichi Arimitsu, Tokyo (JP); Yasuyuki Miyaoka, Yokohama (JP); Masahiko Igaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 627 days.

(21) Appl. No.: 12/953,736

(22) Filed: Nov. 24, 2010

(65) Prior Publication Data
US 2011/0150288 A1    Jun. 23, 2011

(30) Foreign Application Priority Data

Dec. 17, 2009 (JP) .................................. 2009-286281

(51) Int. Cl.
*G06K 9/00* (2006.01)
*G06K 9/52* (2006.01)

(52) U.S. Cl.
USPC .............................. 382/107; 382/206; 353/30

(58) Field of Classification Search
USPC .......... 382/100, 104, 107, 162–167, 190, 195, 382/199, 206; 353/37
See application file for complete search history.

(56) References Cited

U.S. PATENT DOCUMENTS

| | | | |
|---|---|---|---|
| 4,330,196 A | 5/1982 | Yamaguchi | |
| 6,029,118 A | 2/2000 | Strasser | |
| 6,193,376 B1 * | 2/2001 | Hayashi et al. | 353/30 |
| 6,313,460 B1 | 11/2001 | Haas et al. | |
| 6,326,617 B1 * | 12/2001 | Tomie et al. | 250/305 |
| 6,859,548 B2 * | 2/2005 | Yoshioka et al. | 382/128 |
| 7,333,634 B2 * | 2/2008 | McClanahan | 382/107 |
| 8,189,868 B2 * | 5/2012 | Aimura et al. | 382/103 |
| 2003/0218788 A1 * | 11/2003 | Sakai et al. | 359/205 |
| 2006/0034489 A1 * | 2/2006 | McClanahan | 382/107 |
| 2006/0049782 A1 * | 3/2006 | Vornsand et al. | 315/312 |
| 2006/0050965 A1 * | 3/2006 | Chang et al. | 382/199 |
| 2006/0077501 A1 * | 4/2006 | Sakai et al. | 359/205 |
| 2007/0064977 A1 * | 3/2007 | Nagata | 382/107 |
| 2007/0273847 A1 * | 11/2007 | Minami et al. | 353/101 |
| 2008/0120056 A1 * | 5/2008 | Haino et al. | 702/96 |
| 2009/0021186 A1 * | 1/2009 | Kim | 315/294 |
| 2009/0169052 A1 * | 7/2009 | Seki et al. | 382/103 |

(Continued)

FOREIGN PATENT DOCUMENTS

JP    56-166469 A    12/1981
JP    2008-082820 A    4/2008

*Primary Examiner* — Chan Park
*Assistant Examiner* — Mia M Thomas
(74) *Attorney, Agent, or Firm* — Rossi, Kimms & McDowell LLP

(57) ABSTRACT

A velocity detection apparatus detects a position of a moving object at a first timing and a second timing to detect a velocity of the moving object based on a difference between the first timing and the second timing. The first timing is a timing at which an identifiable mark position of the moving object is detected by a first detector and the second timing is a timing at which the mark position is detected by a second detector. The velocity detection apparatus includes a light source and first and second detectors which detects the mark position based on light obtained by illuminating the moving object using the light source. A vertical projection position of the light source onto a plane which is parallel to a main surface of the first or second detector is located between vertical projection positions of the first and the second detector onto the plane.

4 Claims, 3 Drawing Sheets

(56) References Cited

U.S. PATENT DOCUMENTS

| | | |
|---|---|---|
| 2010/0232819 A1 | 9/2010 | Kudo et al. |
| 2010/0265405 A1* | 10/2010 | Toshima et al. ............... 348/687 |
| 2011/0218760 A1* | 9/2011 | Takahama et al. ............ 702/150 |
| 2012/0069323 A1* | 3/2012 | Arimitsu et al. ................ 356/28 |
| 2012/0086338 A1* | 4/2012 | Kim ................................. 315/86 |

* cited by examiner

VELOCITY DETECTION APPARATUS HAVING TWO DETECTORS

BACKGROUND OF THE INVENTION

1. Field of the Invention

The present invention relates to a velocity detection apparatus which detects a velocity of a moving object using two detectors.

2. Description of the Related Art

Recently, in order to reduce a color shift in a color image forming apparatus such as a color copying machine or a color laser beam printer, detecting the variation of the conveying velocity of an intermediate transfer belt (a moving object) with high accuracy is required. As a method of detecting the velocity of the moving object with high accuracy, a method of detecting an interval velocity is known. The method of detecting the interval velocity is a method of measuring a transit time of an identifiable feature point on the moving object to detect the velocity of the moving object. Japanese Patent Laid-Open No. 2008-82820 discloses a method of forming two detectors with high accuracy.

However, when the velocity of the moving object is detected by the method of detecting the interval velocity, an averaged velocity in the frequency range in a distance (an interval length) between the detectors is detected. Therefore, only the velocity variation component equal to or less than a certain frequency range which corresponds to the interval length can be detected. Accordingly, when the velocity in a comparatively high frequency range such as a velocity variation component caused by the decentering of a drive roller or the reduction gear decentering of a drive motor is measured, the interval length needs to be shortened.

On the other hand, two detectors (a first detector and a second detector) are disposed on the same substrate with high accuracy using a well-known semiconductor substrate manufacturing process or the like to be capable of shortening the interval length. However, an image detected by the first detector is obtained by overlapping an image that is reflected to be generated by a first light source illuminating a mark on a moving object and an image that is reflected to be generated by a second light source illuminating the mark on the moving object. The same is applied to the second detector. Therefore, a detected signal is distorted by the generation of the crosstalk of the image due to the plurality of light sources and the velocity detection accuracy is reduced.

SUMMARY OF THE INVENTION

The present invention provides a velocity detection apparatus capable of detecting a velocity in a high range with high accuracy.

A velocity detection apparatus as one aspect of the present invention detects a position of a moving object at a first timing and a second timing to detect a velocity of the moving object based on a difference between the first timing and the second timing. The first timing is a timing at which an identifiable mark position of the moving object is detected by a first detector, and the second timing is a timing at which the mark position is detected by a second detector. The velocity detection apparatus includes a light source configured to illuminate the moving object using divergent luminous flux, a first detector configured to detect the mark position of the moving object based on light obtained by illuminating the moving object using the light source, and a second detector which is provided in parallel to a moving direction of the moving object with respect to the first detector and is configured to detect the mark position of the moving object based on the light obtained by illuminating the moving object using the light source. A vertical projection position of the light source onto a plane which is parallel to a main surface of the first detector or the second detector is located between vertical projection positions of the first detector and the second detector onto the plane.

Further features and aspects of the present invention will become apparent from the following description of exemplary embodiments with reference to the attached drawings.

DESCRIPTION OF THE PREFERRED EMBODIMENTS

Figure 1:
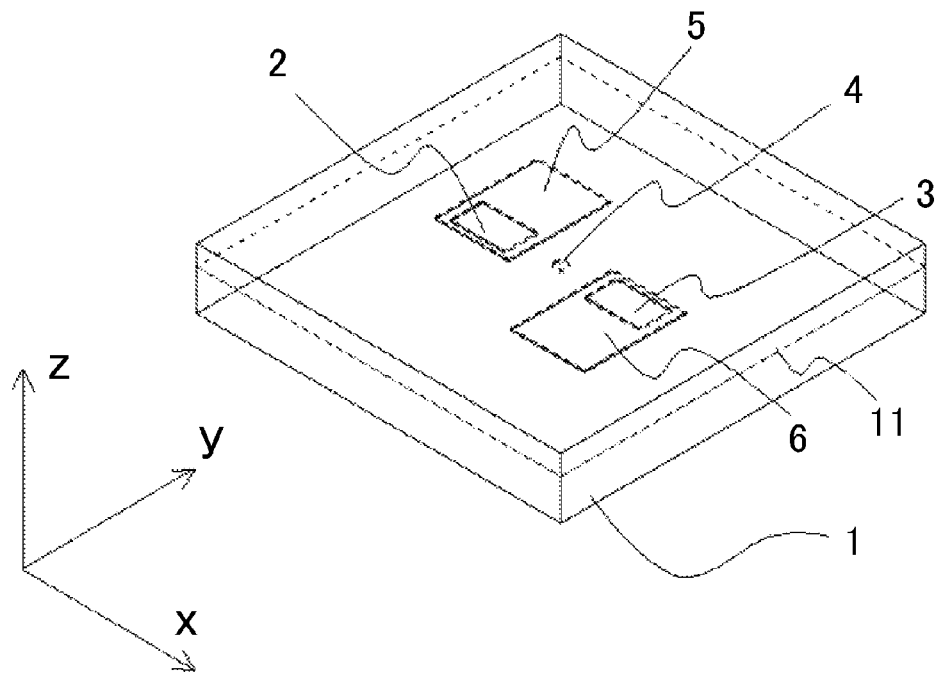
FIG. 1 is a schematic perspective view of a velocity detection apparatus in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

Figure 2:
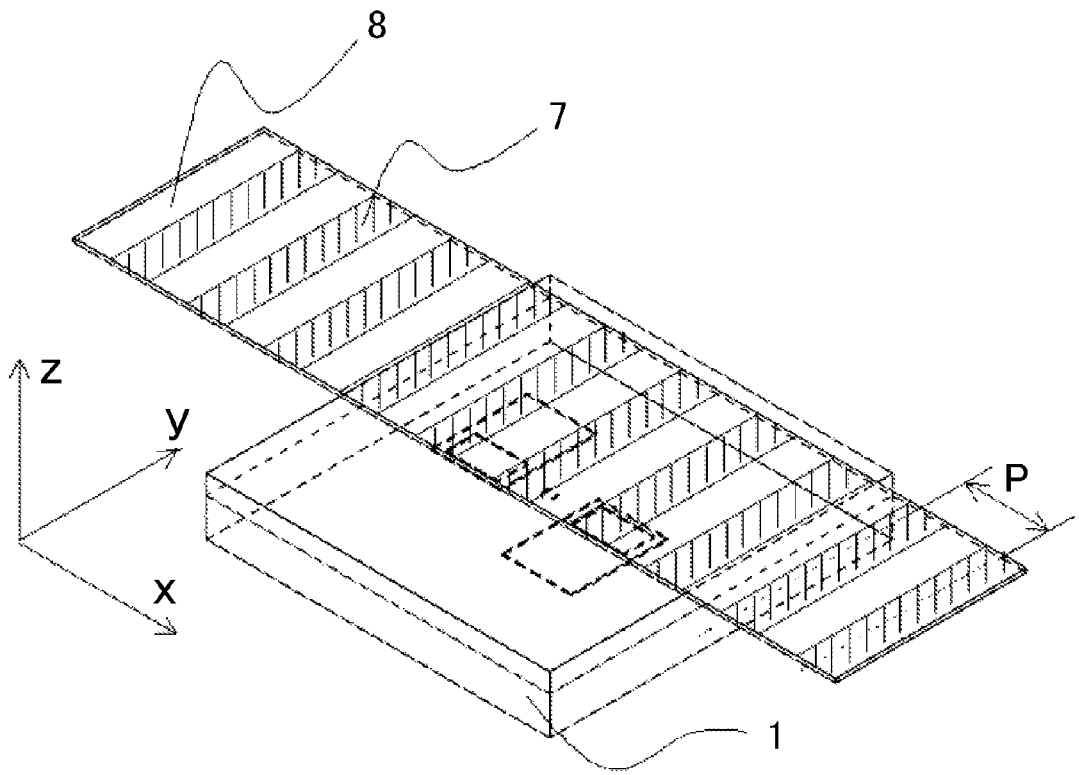
FIG. 2 is a schematic perspective view of a velocity detection apparatus and a moving object in Embodiment 1.

Referring to FIGS. 1 to 4, a velocity detection apparatus of Embodiment 1 will be described. Coordinate axes (x, y, and z axes) used in each of the drawings are common. FIG. 1 is a schematic perspective view of the velocity detection apparatus in the present embodiment. FIG. 2 is a schematic perspective view of the velocity detection apparatus and a moving object in the present embodiment. In FIGS. 1 and 2, reference numeral 1 denotes the velocity detection apparatus (a velocity detection sensor). The velocity detection apparatus 1 detects a position (a specific mark 7) of a moving object 8 at a first timing and a second timing to detect a velocity of the moving object 8 based on the difference between the first timing and the second timing.

In FIG. 1, reference numeral 2 denotes a first detector. The first detector 2 detects the position (the position of the specific mark 7) based on light which is obtained by illuminating the moving object 8 (the specific mark 7) using a light source 4. The timing of detecting the position is defined as the first timing. Reference numeral 3 denotes a second detector. The second detector 3 is provided in parallel to the first detector 2 in a moving direction (in an x-axis direction), and detects the same mark position (the position of the specific mark 7) of the moving object 8 based on the light by illuminating the moving object 8 (the specific mark 7) using the light source 4. The timing of detecting the position is defined as the second timing. Each of the first detector and the second detector is configured by including a photo diode array.

Reference numeral 4 denotes the light source. An illumination light source of divergent luminous flux that can be treated as a point light source is preferably used. The light source 4 illuminates the mark 7 of the moving object 8 by divergent luminous flux. The light source 4 is disposed between the first detector 2 and the second detector 3, and is preferably disposed at a midpoint of a line segment connecting a center of the first detector 2 and a center of the second detector (a midpoint in the x-axis direction). Reference numerals 5 and 6 are signal processors (photo ICs) for outputting electric signals based on light received by the respective first detector 2 and second detector 3. A first photo sensor is configured by mounting the first detector 2 on the signal processor 5 (a first signal processor). A second photo sensor is configured by mounting the second detector 3 on the signal processor 6 (a second signal processor). Reference numeral 11 denotes a substrate. In the present embodiment, the light source 4, the signal processor 5 mounting the first detector 2, and the signal processor 6 mounting the second detector 3 are disposed on the substrate 11. However, the present embodiment is not limited to this, and the light source 4 and the signal processors 5 and may also be disposed on different substrates, respectively.

As illustrated in FIG. 2, the moving object 8 is an object to be detected by the velocity detection apparatus 1, and is configured to be movable at a predetermined velocity in an x-axis direction at a position facing the velocity detection apparatus 1. The moving object 8 contains the marks 7 which are continuously provided at predetermined intervals P as indicated by hatching in FIG. 2. The velocity detection apparatus 1 of the present embodiment is configured to be capable of detecting the velocity of the moving object 8 in the x-axis direction.

Figure 3:
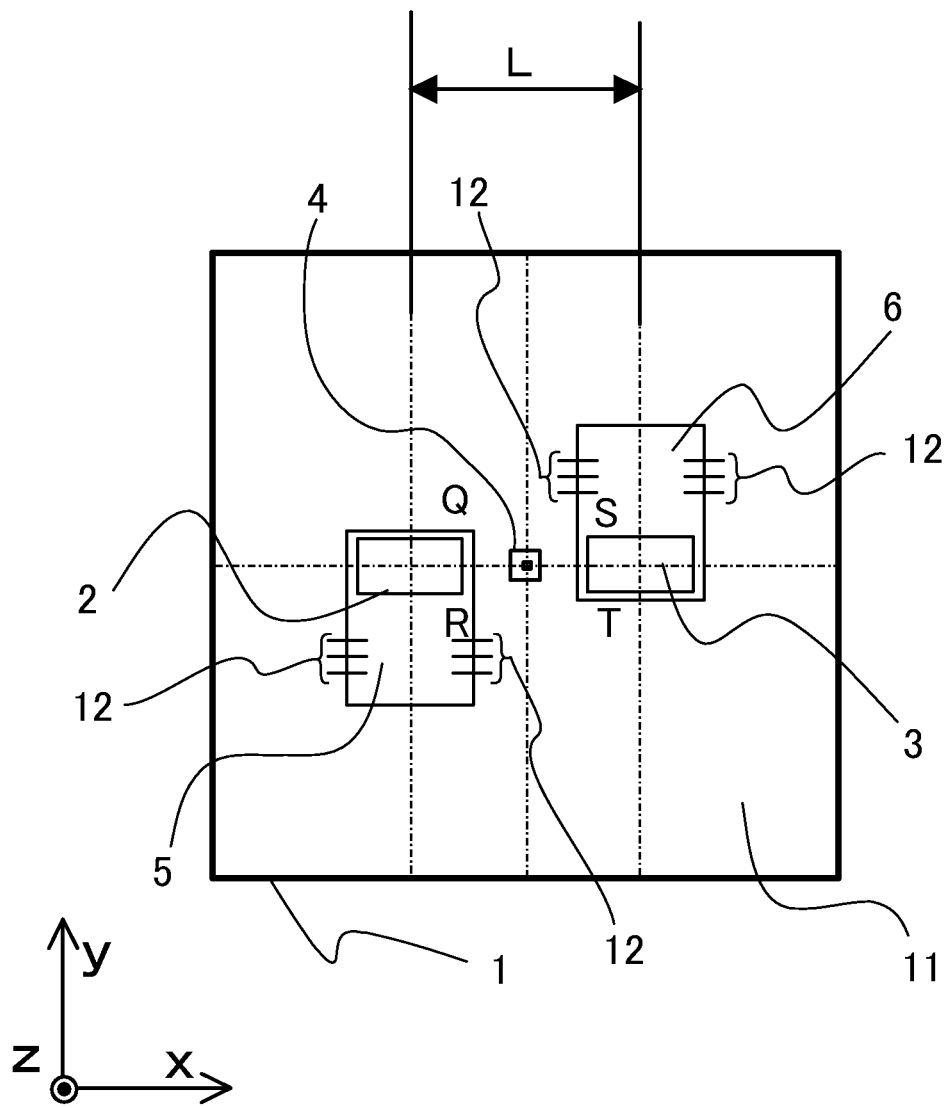
FIG. 3 is a schematic plan view of a velocity detection apparatus in Embodiment 1.

FIG. 3 is a schematic plan view of the velocity detection apparatus 1 in the present embodiment. As illustrated in FIG. 3, the first detector 2 and the second detector 3 are disposed away from each other at a distance L. As described above, it is preferable that the light source 4 is disposed at a center between the first detector 2 and the second detector 3. However, the embodiment is not limited to this, and a vertical projection position of the light source 4 in a z-axis direction onto a plane which is parallel to main surfaces of the first detector 2 and the second detector 3 has only to be positioned at an inside (a boundary region) of a square that has four edge points of two points Q and R that are edge points of the first detector 2 and of two points S and T that are edge points of the second detector 3. In the present embodiment, all of the light source 4, the first detector 2 (the signal processor 5), and the second detector 3 (the signal processor 6) are provided on the substrate 11 (on the same plane), and they are electrically connected with wires on the substrate 11 by wire bonding using wires 12. The wires 12 are provided at a region different from that of the first detector 2 or the second detector 3. Therefore, the signal processors 5 and 6 are disposed at an angle of 180 degrees each other so as to suppress the interference caused by the wires 12.

The pre sent embodiment is applicable even when all of them are not disposed on the same plane. In this case, the vertical projection position (a projection position in the z direction) of the light source 4 onto the substrate 11 is set so that the square constituted of vertical projection points Q, R, S, and T of the edge points of the first and second detectors 2 and 3 onto the substrate 11 exists inside a square which is formed by the vertical projection onto the substrate 11. Thus, the vertical projection position of the light source 4 onto a plane that is parallel to the main surface of the first detector 2 or the second detector 3 is located between the vertical projection positions of the first detector 2 and the second detector 3 onto the plane.

Figure 4:
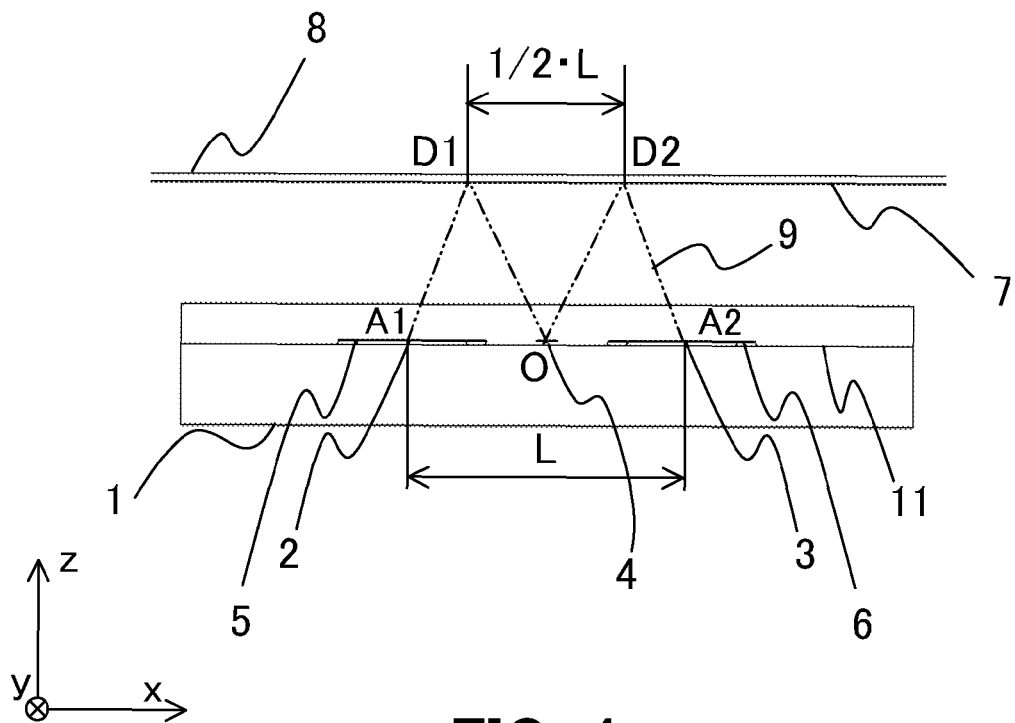
FIG. 4 is a schematic front view of a velocity detection apparatus and a moving object in Embodiment 1.

FIG. 4 is a schematic front view of the velocity detection apparatus 1 and the moving object 8. In FIG. 4, two representative light beams 9 which are emitted from a light emitting point O of the light source 4 that is one light source are indicated by dashed-two dotted lines. The two representative light beams 9 emitted from the light emitting point O are reflected on points D1 and D2 on the mark 7 provided on the moving object 8 to enter a center A1 of the first detector 2 and a center A2 of the second detector 3, respectively.

With respect to the detection principle by using the first detector 2 and the second detector 3, for example the following method exists. The light source 4 directly illuminates the mark 7 which is provided on the moving object 8 by the divergent luminous flux from the light emitting point O that is treated as a point light source using a current confinement LED or the like. The light emitted from the light source 4 is reflected on the mark 7, and a Fourier image obtained by the reflected and diffracted light (a diffracted interference image) is received by the first detector 2 and the second detector 3. When the light source 4, the first detector 2, and the second detector 3 are positioned in the same plane and the velocity detection apparatus 1 is a reflective-type detection apparatus, spatial periods of brightness and darkness of the Fourier image observed by the first detector 2 and the second detector 3 are twice as long as array periods (the intervals P) of the marks 7. For example, when the first detector 2 and the second detector 3 have periodical array structures using photo diodes or the like, array pitches of the photo diodes are set twice as long as the interval P that is a designed value of the interval of the marks 7. In such a configuration, the SN of a signal can be set to be heightened. The above detection principle is one example, and the embodiment is not limited to this.

As illustrated in FIG. 4, when a mounting distance of the first detector 2 and the second detector 3 (a distance between the centers A1 and A2) is defined as L, an interval length in a method of detecting an interval velocity is a distance between the points D1 and D2. The interval length is $(\frac{1}{2}) \cdot L$ that is half of the mounting distance of the first detector 2 and the second detector 3 (the distance L) according to its geometric relation. When the first timing at which the first detector 2 detects the specific mark 7 is defined as $t_C$ and the second timing at which the second detector 3 detects the same mark 7 is defined as $t_D$, a moving velocity v of the moving object 8 is represented by the following Expression (1).

$$v = \frac{L}{2(t_D - t_C)} \quad (1)$$

An interval length by a conventional method of detecting the interval velocity was a mounting distance of the two detectors, but according to the present embodiment, the interval length is reduced to ½ compared with the conventional one and therefore a frequency range of detectable velocities can be improved twice. For example, when the length L is set to 3 mm, the interval length is 1.5 mm that is half of the length of the distance L.

In the present embodiment, the light emitting point O of the light source 4, the first detector 2, and the second detector 3 are disposed on the same plane. Therefore, a gap dependency of an optical magnification change with respect to the variation of a relative distance (a gap) between the first and second detectors 2 and 3 and the moving object 8 does not exist, and a gap dependency of a detected signal error is reduced. Accordingly, when the velocity detection of an intermediate transfer belt or the like in a color image forming apparatus is performed, the detection error which is generated by the flopping of the intermediate transfer belt or the like can be reduced.

In the present embodiment, the single light source 4 is used for the first detector 2 and the second detector 3 that are a plurality of detectors. Therefore, the crosstalk problem of the light source is not generated and the velocity error caused by the crosstalk does not occur. Thus, in the present embodiment, because the crosstalk problem of the light source is not generated, the first detector 2 and the second detector 3 can be mounted on the substrate 11 (on the same substrate) using a semiconductor substrate process. Therefore, the distance between the first detector 2 and the second detector 3 (the mounting interval) can be set at the minimum and with high accuracy and the size of the velocity detection apparatus 1 can be reduced. In this case, as illustrated in FIG. 3, it is preferable that the second photo sensor (the signal processor 6) is mounted on the substrate 11 by the rotation of 180 degrees with reference to the first photo sensor (the signal processor 5) around the light source 4. In other words, it is preferable that the first photo sensor and the second photo sensor are disposed differently by 180 degrees from each other when they are projected onto a plane which is parallel to the main surface of the first detector 2 or the second detector 3 (a plane parallel to an xy plane). Such a mounting can prevent the interference of the wires 12 each other which are extracted from the signal processors 5 and 6 even if the size of the mounting interval is small. Furthermore, the number of the light source with respect to the first detector 2 and the second detector 3 is set to be one to be able to reduce the cost of one light source and the power consumption.

In the present embodiment, the configuration of the reflective-type velocity detection apparatus is described as an example, but the present invention is not limited to this. In the present embodiment, the moving object 8 contains the mark 7, but it does not have to specially contain a mark and it is sufficient if a position on the moving object is identifiable. As a configuration of identifying the position without the special mark on the moving object, a speckle pattern, a reflection image, or a transmission image may also be used. The present embodiment is also applicable to a transmissive-type velocity detection apparatus which is configured to dispose the moving object 8 between the light source 4 and each of the first and second detectors 2 and 3.

Embodiment 2

Next, referring to FIG. 5, a velocity detection apparatus of Embodiment 2 will be described. In Embodiment 1, the case where the light emitting point O of the light source 4 and each of the first and second detectors 2 and 3 are disposed on the same plane was described. On the other hand, in the present embodiment, a case where the light emitting point O of a light source 104 and each of a first detector 102 and a second detector 103 are not disposed on the same plane will be described. Similarly to the case of Embodiment 1, coordinate axes (x, y, and z axes) used in each of the drawings are common.

Figure 5:
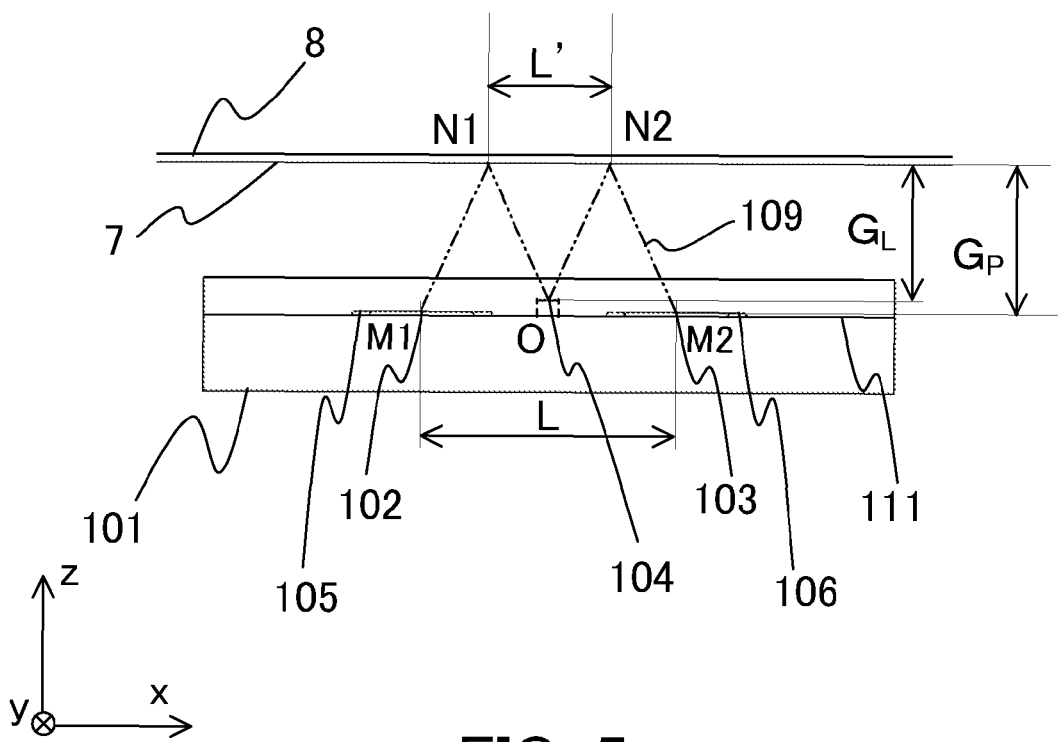
FIG. 5 is a schematic front view of a velocity detection apparatus and a moving object in Embodiment 2.

FIG. 5 is a schematic front view of the velocity detection apparatus 101 and the moving object 8. In FIG. 5, two representative light beams 109 which are emitted from a light emitting point O of a light source 104 are indicated by dashed-two dotted lines. The two representative light beams 109 emitted from the light emitting point O are reflected on points N1 and N2 on the mark 7 which is provided on the moving object 8, and enter a center M1 of a first detector 102 and a center M2 of a second detector 103, respectively.

As illustrated in FIG. 5, the first detector 102 and the second detector 103 are disposed on the same plane. On the other hand, the light source 104 is not disposed on the same plane as that of the first detector 102 and the second detector 103, and is disposed at remove of a predetermined distance in a z-axis direction. In other words, the light source 104 is disposed on a straight line which contains a midpoint of a line segment connecting the center M1 of the first detector 102 and the center M2 of the second detector 103 and is parallel to the z-axis. $G_L$ denotes a distance between the light emitting point O of the light source 104 and the moving object 8, and $G_P$ denotes a distance between the first detector 102 or the second detector 103 and the moving object 8. A distance between the first detector 102 and the second detector 103 is defined as L, and an interval length of detecting an interval velocity (a distance between points N1 and N2) is defined as L'.

In the present embodiment, the distance L is a distance between the points M1 and M2, and the interval length L' of the interval detection is a distance between the points N1 and N2. In this case, the size of the interval length L' in the method of detecting the interval velocity is represented by the following Expression (2).

$$L' = \frac{G_L}{G_P + G_L} L \qquad (2)$$

In Expression (2), $G_P$ and $G_L$ which meet the condition of $G_P > G_L$ are selected to be able to meet the condition of $L' < (1/2) \cdot L$. Therefore, according to the present embodiment, if the distance L is the same as that of Embodiment 1, the interval length can be shortened compared to the case of Embodiment 1 and the velocity in a higher frequency range can be detected.

In the velocity detection apparatus 101 of the present embodiment, the case where the first detector 102 and the second detector 103 are mounted on the same plane (on a substrate 111) is described, but the present embodiment is not limited to this. The mounting position of the light source 104 is not limited to the configuration of the present embodiment, and a vertical projection position of the light source 104 onto a plane which is parallel to a main surface of the first detector 102 or the second detector 103 has only to be located between vertical projection positions of the first detector 102 and the second detector 103 onto the plane. The velocity detection apparatus 101 of the present embodiment is a reflective-type velocity detection apparatus, but the present embodiment is not limited to this. The present embodiment is also applicable to a transmissive-type velocity detection apparatus which is configured to dispose the moving object 8 between the light source 104 and each of the first detector 102 and the second detector 103.

The velocity detection apparatus of each of the above embodiments is, for example, effective in reducing a color shift by detecting the moving velocity of the intermediate transfer belt to perform a feedback control of a rotational frequency of a drive roller in a color image forming apparatus such as a color copying machine or a color laser beam printer. A higher frequency component caused by the decentering of the drive roller or by a reduction gear system of a drive motor exists in the velocity variation of the intermediate transfer belt of the color image forming apparatus. Using the velocity detection apparatus of each of the above embodiments, the velocity in the higher frequency range can be detected.

According to each of the above embodiments, the interval length of the velocity detection can be shortened compared to the size of the mounting interval. Furthermore, because one light source is used for a plurality of detectors, the reduction of the detection accuracy caused by the crosstalk of the light source can be suppressed. Therefore, according to each of the embodiments, a velocity detection apparatus capable of detecting the velocity in a wide range with high accuracy can be provided. Additionally, the number of the light sources is reduced to be able to reduce the cost, the power consumption, and the size of the velocity detection apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-286281, filed on Dec. 17, 2009, which is hereby incorporated by reference herein in its entirety.

What is claimed is:

1. A velocity detection apparatus which detects a position of a moving object at a first timing and a second timing to detect a velocity of the moving object using a difference between the first timing and the second timing, the first timing being a timing at which an identifiable mark position of the moving object is detected by a first detector, the second timing being a timing at which the mark position is detected by a second detector, the velocity detection apparatus comprising:
   one light source configured to illuminate the moving object using divergent luminous flux;
   a first photo sensor that includes a first signal processor and a first detector configured to detect the mark position of the moving object based on light obtained by illuminating the moving object using the one light source; and
   a second photo sensor that includes a second signal processor and a second detector disposed at a position shifted in a moving direction of the moving object with respect to the first detector and is configured to detect the mark position of the moving object based on the light obtained by illuminating the moving object using the one light source,
   wherein a vertical projection position of the light source onto a plane, which is parallel to a main surface of the first detector or the second detector, is located between vertical projection positions of the first detector and the second detector onto the plane, and
   wherein the first photo sensor and the second photo sensor are disposed differently from each other when being projected onto the plane.

2. The velocity detection apparatus according to claim 1, wherein:
   the first detector and the second detector are configured to detect the mark position of the moving object based on light reflected on the moving object, and
   the light source, the first detector, and the second detector are disposed on the same plane.

3. The velocity detection apparatus according to claim 1, wherein:
   the first signal processor and the second signal processor are provided on one substrate and are electrically connected with wires on the substrate by wire bonding, and
   the first photo sensor and the second photo sensor are disposed facing directions different by 180 degrees from each other when projected onto the plane.

4. A color image forming apparatus for forming a color image, the color image forming apparatus comprising:
   a moving object provided with an identifiable mark and configured to move in association with forming the color image; and
   a velocity detection apparatus which detects a position of the moving object at a first timing and a second timing to detect a velocity of the moving object using a difference between the first timing and the second timing, the first timing being a timing at which a mark position of the identifiable mark of the moving object is detected by a first detector, the second timing being a timing at which the mark position is detected by a second detector,
   wherein the velocity detection apparatus includes:
   one light source configured to illuminate the moving object using divergent luminous flux;
   a first photo sensor that includes a first signal processor and a first detector configured to detect the mark position of the moving object based on light obtained by illuminating the moving object using the one light source; and
   a second photo sensor that includes a second signal processor and a second detector disposed at a position shifted in a moving direction of the moving object with respect to the first detector and is configured to detect the mark position of the moving object based on the light obtained by illuminating the moving object using the one light source,
   wherein a vertical projection position of the light source onto a plane, which is parallel to a main surface of the first detector or the second detector, is located between vertical projection positions of the first detector and the second detector onto the plane, and
   wherein the first photo sensor and the second photo sensor are disposed differently from each other when being projected onto the plane.

* * * * *